Feb. 16, 1954 R. C. OLESEN 2,669,697

TRANSFORMER COUPLING NETWORK

Filed July 15, 1948 3 Sheets-Sheet 1

INVENTOR:
RAYMOND C. OLESEN

BY Reed C. Lawlor

AGENT.

Feb. 16, 1954 R. C. OLESEN 2,669,697

TRANSFORMER COUPLING NETWORK

Filed July 15, 1948 3 Sheets-Sheet 2

INVENTOR:
RAYMOND C. OLESEN
BY Reed C. Lawlor
AGENT.

INVENTOR:
RAYMOND C. OLESEN
BY Reed C. Lawlor
AGENT.

Patented Feb. 16, 1954 2,669,697

UNITED STATES PATENT OFFICE 2,669,697

TRANSFORMER COUPLING NETWORK

Raymond C. Olesen, Altadena, Calif., assignor, by mesne assignments, to Transformer Engineers, a corporation of California Application July 15, 1948, Serial No. 38,852

18 Claims. (Cl. 333—24)

My invention relates to electrical signal reproducing systems, and more particularly to improvements in networks employing transformers for coupling successive parts or stages of such a system.

It is conventional practice to employ a transformer to couple the input of an electric amplifier to the output of another circuit, which for convenience is called an "input circuit." For this purpose it is conventional to connect the primary winding of the transformer to the output of the input circuit and a secondary winding to the input of the amplifier. In many applications it is desirable to arrange the connections in such a way that the impedance which appears to be connected externally across the output of the input circuit is of a constant resistance value. For simplicity the impedance which is seen when measurements are made across a primary winding of a transformer is hereinafter referred to as the virtual or apparent primary impedance, or sometimes simply as the primary impedance, or simply as the transformer input impedance.

It is conventional to resort to impedance matching methods when the input circuit is designed to possess certain known characteristics when feeding into a known constant resistance load, and the actual load to be supplied from the transformer secondary has an impedance which does not equal the constant resistance mentioned. Such impedance matching methods are used for example, when an electrical amplifier having a capacitive input is to be supplied from a line or other input circuit which has an output impedance equal to the constant resistance mentioned. Very often such output impedance is of low value—say about 400 to 600Ω or lower, and very often when an amplifier is being fed from such a line, a voltage step-up transformer is employed.

In conventional impedance matching methods, it is customary to connect a large resistance across the secondary winding of the transformer so that the virtual primary impedance is nonreactive in character over a wide frequency range. The introduction of such a resistance across a transformer causes a reduction in the gain that could otherwise be obtained with the transformer and also causes an increase in the power consumed over the amount that would otherwise be consumed. This power consumption is generally minimized by employing a transformer of the power type. Even in the best circuit designs of this type, the apparent input impedance of the transformer varies greatly with frequency over the range of frequencies of interest. Since such variation of the transformer input impedance with frequency causes undesirable frequency discrimination, this fact increases the difficulty of calculating in advance the frequency characteristics that will be obtained from any particular circuit design in which an amplifier is connected to an input circuit through a transformer.

The object of my invention is to provide an improved system of matching the input impedance of a transformer with the output impedance of an input circuit.

According to my invention, impedance matching is accomplished by employing a transformer coupling network which utilizes a specially designed equalizing circuit connected to the primary winding of the transformer. The equalizing circuit includes an impedance which bears a reciprocal relationship with the virtual primary impedance of the transformer. Since impedance matching may be accomplished in accordance with this invention without employing a resistor across the secondary winding, all the disadvantages attendant upon the introduction of such a resistance in an amplifier circuit are eliminated and the use of voltage-type rather than power-type transformers for impedance-matching is facilitated.

The transformer coupling networks of my invention are superior to those previously employed in two important respects. First, the characteristic input impedance of my type of transformer network is more nearly constant over any given range of frequencies, thereby simplifying the design of amplifier circuits. Secondly, with my transformer network it is possible to achieve either a higher amplification over a predetermined frequency band, or conversely, a predetermined amplification over a wider frequency band. In either of the latter cases, the employment of my transformer coupling network results in an increase in the signal-to-noise ratio at the input of an electrical amplifier used therewith.

My invention possesses many other objects and advantages in addition to the foregoing, all of which will be more readily apparent from a consideration of exemplary embodiments of my invention. For this purpose four forms of transformer networks embodying the features of my invention are illustrated in the accompanying drawings which form a part of the present specification. These forms of my invention will now be described in detail in order to illustrate the general principles of the invention; but it is to be understood that the invention is not limited to the details of the forms illustrated and described, but that its scope is best ascertained by reference to the appended claims.

In the drawings wherein like legends in the several figures represent the same parts:

FORM 1. GENERAL DESCRIPTION

Figure 1:
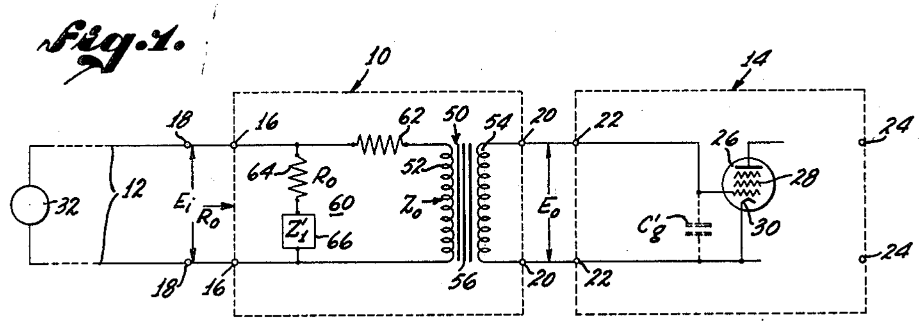
Figure 1 is a schematic wiring diagram of an electrical amplifier circuit employing one form of my transformer coupling network.

Referring to Figure 1, there is illustrated an electrical circuit in which a transformer coupling network 10 embodying features of my invention is employed to couple or interconnect an input circuit or line 12 with a load in the form of an audio-frequency amplifier 14. More particularly, the input terminals 16 of the transformer coupling network 10 are connected to the respective output terminals 18 of the input circuit 12 and the output terminals 20 of the transformer coupling network are respectively connected to the input terminals 22 of the amplifier 14. The coupling network 10 of my invention has an input impedance which is a substantially constant resistance $R_0$ in spite of the non-resistive character of the transformer 50 employed therein and the non-resistive character of the load supplied.

The electrical amplifier 14 comprises one or more electrical amplifying stages connected in tandem in amplifying relationship between the input terminals 22 and the output terminals 24. Only the amplifier tube 26 of the first or input stage is here illustrated. This amplifier tube 26 includes a control grid 28 and a cathode 30 which are respectively connected to the two input terminals 22. Preferably, the amplifier tube 26 is of a type and is operated under such conditions that it has a high input impedance, usually being operated for this purpose as a class A amplifier. In the practical applications with which my invention is primarily concerned, the input impedance is in the form of a grid-cathode capacitance $C_g'$. This capacitance includes two main parts, one part being due to the internal electrode capacitance existing between the grid 28 and the cathode 30 within the envelope of the amplifier tube 26, and the other part being due to the stray capacitance between the leads which connect the electrodes 28 and 30 to the input terminals 22 of the amplifier 14. In practice the value of the capacitance $C_g'$ is usually made as low as possible in order to minimize attenuation of the amplifier at high frequencies. For example, in many well designed amplifiers employing input amplifier tubes 26 of the pentode type such as 6J7, the value of this input capacitance is usually of a low value of about 12 $\mu\mu$F.

The input circuit 12 is here illustrated in the form of a cable which leads over considerable distance to a source 32 of electrical signals. The source 32 may be in the form of a microphone or a phonograph pick-up, or any other device which operates to translate vibrations into electrical signals which are to be amplified. The input circuit 12 may, however, be in the form of a filter network or may even be another amplifier. In the examples of the invention here considered, the input circuit 12 either possessess a characteristic impedance which is in the form of a substantially pure constant resistance $R_0$ or is at least designed to feed into a circuit having a pure constant resistance $R_0$ in order that the input circuit may possess certain specified characteristics over a predetermined band of frequencies. In an audio-frequency amplifier the band of waves to be amplified frequently extends from about 16 C. P. S. to 16,000 C. P. S.

The transformer coupling network 10 of my invention which interconnects the input circuit 12 and the amplifier 14 is designed to have an input impedance (that is, impedance measured across the input terminals 16), which is a substantially pure constant $R_0$ over the band of frequencies of interest. The transformer coupling network 10 is also designed to amplify input voltages and to impress them upon the input of the amplifier 14 at a relatively high level with a minimum amount of attenuation of signals at high frequencies. To accomplish these results, an iron core voltage-step-up transformer 50 and an equalizing circuit 60 designed in accordance with the principles of my invention are here employed.

The transformer 50 comprises a primary winding 52 and a secondary winding 54 wound upon an iron core 56. Opposite ends of the secondary winding 54 are connected across the output terminals 20 in order that output signals may be impressed upon the input terminals 22 of the amplifier 14. One resistor 62 of the equalizing circuit 60 is connected in series with the primary winding 52 across the input terminals 16 of the transformer coupling network 10. Another resistor 64 and a reciprocal impedance network 66 of the equalizing network 60 are connected in series across the input terminal 16, thus being in parallel relationship with a circuit which includes the first mentioned resistor 62 and the primary 52.

In one way of practicing my invention the first resistor 62 has a value of resistance equal to the desired input resistance $R_0$ diminished by the D. C. or low frequency resistance of the primary winding 52, that is, a value equal to $R_0-R_c$; and the second resistor 64 has a value of resistance equal to the desired input resistance $R_0$. The impedance network 66 is so designed as to bear a reciprocal relationship with the virtual primary impedance of the transformer 50, that is, the impedance as viewed looking into the primary winding 52 over the range of frequencies of signals to be amplified. More particularly, this reciprocal relationship is expressed by the equation $$Z_1'(\omega)=\frac{R_0^2}{Z_0(\omega)-R_c} \qquad (1)$$

In this equation $\omega=2\pi f$ where $f$ is the frequency of any impressed signal. Also in this equation $Z_0(\omega)$ is the impedance at any frequency $f$, looking into the primary winding 52. And also in this equation, $Z_1'(\omega)$ is the corresponding value of the impedance of the network 66 at the same frequency $f$. In this application, expressions such as "$F(\omega)$," which are functions of frequency, are sometimes written as $F(\omega)$, and sometimes simply written as F. In practice, the value of $Z_0$; that is $Z_0(\omega)$, is determined with a load connected across the output terminals 20 which are equivalent to the input impedance (in this case the impedance of $C_g'$) of the amplifier to which the coupling network 10 is to be connected.

FORM 1. PRINCIPLES OF DESIGN OF TRANSFORMER COUPLING NETWORK

The principles for designing a network such as the impedance network 66 which is the reciprocal of another known network are well known and are explained in various text books such as "Communication Networks" by Ernst A. Guilleman (John Wiley and Sons, 1931). Before designing the impedance network 66, however, it is necessary to know the full nature of the input impedance $Z_0$ of the transformer 50. An equivalent circuit of the transformer 50 and an equivalent of the virtual input impedance $Z_0$ which are applicable to an audio frequency amplifier 14 operated from a low impedance line 12, are illustrated in Figures 2 and 3 respectively.

Figure 2:
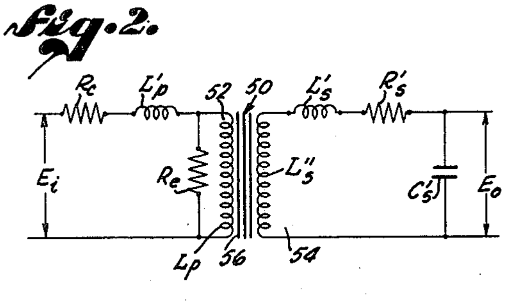
Figure 2 is a schematic wiring diagram representing the electrical characteristics of a transformer.

Referring to Figure 2, it is to be noted that the primary winding 52 of the transformer 50 may be represented by a series resistance $R_c$, a leakage inductance $L_p'$, and an incremental primary inductance $L_p$ all connected in series, and a resistance $R_e$ shunting the incremental inductance $L_p$. The resistance $R_e$ represents the effective resistance corresponding to the power consumed by the core 56 due to eddy current losses. Also referring to Figure 2, it is to be noted that the secondary winding 54 may be represented by a secondary leakage inductance $L_s'$, a secondary resistance $R_s'$, and a secondary distributed capacitance $C_s'$, all connected in series across an incremental secondary inductance $L_s''$. In this equivalent circuit a coupling coefficient of unity exists between the incremental primary and secondary inductances $L_p$ and $L_s''$. The capacitance $C_g'$ of the load (not shown in Fig. 2) is connected in parallel with the secondary distributed capacitance $C_s'$. The equivalent circuit illustrated in Figure 2 neglects the capacitance existing between the primary and secondary windings 52 and 54, and the primary distributed capacitance for the reason that these capacitances are of negligible value in many applications. In the event that their values are not negligible, due account may be taken of them by those skilled in the art in accordance with the principles of my invention without requiring any further explanation here.

Figure 3:
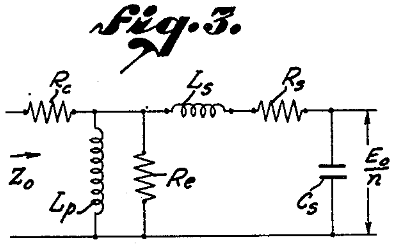
Figure 3 is a schematic wiring diagram of an equivalent circuit of the transformer impedance as viewed from the primary side thereof.

The input impedance $Z_0$ of the loaded transformer which is represented by the equivalent circuit illustrated in Figure 3, is derived from the circuit of Figure 2 by referring the various elements of the secondary winding of the latter to unity turns ratio. When this is done, the equivalent circuit includes an inductance $L_s$, a Resistance $R_s$, and a capacitance $C_s$, all connected in series across the incremental primary winding inductance $L_p$ and the parallel resistance $R_e$. The value of the inductance $L_s$, the resistance $R_s$, and the condenser $C_s$ are related to the constants of the primary and secondary windings 52 and 54 and the input capacitance $C_g'$ of the amplifier 14 by the following equations:

$$L_s=\frac{L_s''}{n^2}+L_p' \qquad (2)$$

$$R_s=\frac{R_s'}{n^2} \qquad (3)$$

$$C_s=n^2(C_s'+C_g') \qquad (4)$$

where $$n=\frac{\text{number of turns on secondary winding}}{\text{number of turns on primary winding}}$$

It is to be noted that in this equivalent circuit, full account is taken of the nature of the capacitive load $C_g'$ to be supplied from the secondary winding 54. Here it is to be noted that the output voltage $E_0$ appears across the condenser $C_s'$ of the equivalent circuit of Figure 2; and that in the equivalent circuit represented in Figure 3, the voltage appearing across the condenser $C_s$ is equal to $$\frac{E_0}{n}$$

Figure 4:
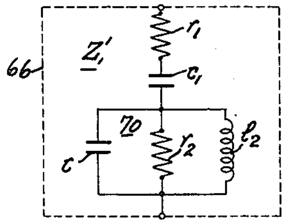
Figure 4 is a schematic wiring diagram of an impedance which bears a reciprocal relationship with the primary impedance of the transformer.

In Figure 4 there is illustrated a network 66 which bears a reciprocal relationship to the networks illustrated in Figures 2 and 3 in accordance with Equation 1. The network 66 comprises a resistance $r_1$ and a condenser $c_1$ connected in series with a parallel network 70 having three branches, which respectively comprise a condenser $c_2$, a resistance $r_2$, and an inductance $l_2$. The values of the various circuit elements of the impedance network 66 are related to those of the equivalent network illustrated in Figures 2 and 3 and to the load by the following equations:

$$r_1=\frac{R_0^2}{R_e} \qquad (5)$$

$$c_1=\frac{L_p}{R_0^2} \qquad (6)$$

$$c_2=\frac{L_s}{R_0^2} \qquad (7)$$

$$r_2=\frac{R_0^2}{R_s} \qquad (8)$$

$$l_2=R_0^2C_s \qquad (9)$$

Where the value of any factor such as the primary inductance $L_p$ varies with signal strength, an average value applicable to the conditions of operation is employed. Since the resistance $r_1$ is actually in series with the resistance 64, the two may be replaced by a single resistance having a value equal to $R_0+r_1$.

Taking due account of the circuit relations expressed by Equations 2 and 9 inclusive, an analysis of the transformer coupling network 10 shows that the voltage $E_0$ appearing at its output is related to the voltage $E_i$ impressed upon its input from the line 12 by the following equation:

$$E_0=\frac{j\omega L_p}{(R_0-R_c+Z_0)(j\omega L_p+Z_s)j\omega C_s}nE_i \quad (10)$$

where $$Z_s(\omega)=R_s+j\omega L_s+\frac{1}{j\omega C_s} \quad (11)$$

At low frequencies Equation 10 reduces to $$E_{0l}=\frac{j\omega L_p}{R_0+j\omega L_p}nE_i \quad (12)$$

and at high frequencies it reduces to $$E_{0h}=\frac{nE_i}{(1-\omega^2L_sC_s)+j\omega(R_0+R_s)C_s} \quad (13)$$

and at median frequencies where $$R_0<wl_p<Z_s<R_c$$

and $$\left|R_s+j\omega L_s\right|<\frac{1}{\omega C_s}$$

Equation 10 reduces to $$E_{0m}=nE_i \quad (14)$$

Figure 5:
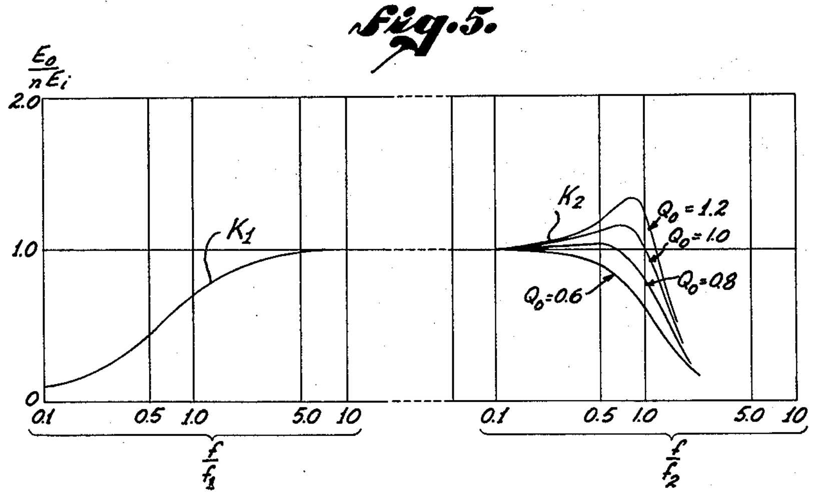
Figure 5 is a graph illustrating characteristics of my transformer coupling network.

Further analysis shows that the relative voltage amplification obtained with this circuit at low frequencies may be represented by the curve $K_1$ illustrated in Figure 5. This curve $K_1$ represents the equation $$\frac{E_{0l}}{nE_i}=\left|\frac{1}{1-j\frac{f_1}{f}}\right| \quad (15)$$

where $$f_1=\frac{R_0}{2\pi L_p} \quad (16)$$

The frequency $f_1$ of Equation 15 is the frequency at which the voltage amplification is down 3 db compared to the voltage amplification at median frequencies.

Likewise the relative voltage amplification at high frequencies is represented by a family of curves $K_2$ of Figure 5. These curves represent the equation $$\frac{E_{0h}}{nE_i}=\left|\frac{1}{\left(1-\frac{f^2}{f_0^2}\right)+j\frac{f}{f_2}\frac{1}{Q_0}}\right| \quad (17)$$

where $f_2$, the series resonant frequency of the secondary winding, with the capacitive load attached is given by the equation $$f_2=\frac{1}{2\pi\sqrt{L_sC_s}} \quad (18)$$

and the damping coefficient is:

$$Q_0=\frac{2\pi f_2L_s}{R_0+R_s} \quad (19)$$

Graphs of the curves $K_2$ representing the relative voltage amplification for several different values of damping coefficient $Q_0$ about equal to unity are illustrated in Figure 5.

By virtue of the fact that the transformer coupling network 10 does not employ a resistor connected across the secondary winding 54 as in conventional practice as hereinabove explained, the transformer 50 may be of the voltage-amplifying type instead of the power-type. As a result, higher gauge wire, that is, wire of smaller diameter, may be employed in the secondary winding of the transformer 50 compared to the gauge of the wire required in impedance matching transformers of the power-type. By virtue of the fact that smaller-diameter wire may be employed in the secondary winding, all other things being equal, the secondary winding may be arranged in a group of mutually-spaced-apart sections, thereby resulting in a reduction of the value of the secondary distributed capacitance $C_s'$ and thereby resulting in an increase in the series resonant frequency $f_2$ of the secondary winding. Conversely, more turns may be added to the secondary winding to attain a given series resonant frequency, thereby increasing the turns ratio $n$. Thus the employment of such transformers in the coupling circuit 10 brings about the amplification of a wider band of signal frequencies for a given value of voltage amplification (or turns ratio). And conversely for a given frequency band, higher amplification at median frequencies may be obtained.

In practice the secondary winding is designed to yield a predetermined high value of resonant frequency $f_0$ near the top of the frequency band of signals which are to be amplified. The resonant frequency so obtained, which is given by Equation 18, is practically independent of the primary winding characteristics. Once the series resonant frequency $f_2$ has been set, the turns ratio is then established at such a value as to yield the desired value of damping coefficient $Q_0$ given by Equation 19, taking due account of the value of the characteristic impedance $R_0$ to be matched and the resistance of the secondary winding $R_s$ referred to the primary. The turns-ratio required for this purpose is determined very largely by the total leakage inductance $L_s$ and the geometry of the core. The primary winding is then wound with the number of turns required to produce the desired leakage inductance $L_s$ for the given geometry. The value of the primary incremental inductance $L_p$ so obtained, determines the low frequency cut-off $f_1$ in accordance with Equation 16.

Figure 6:
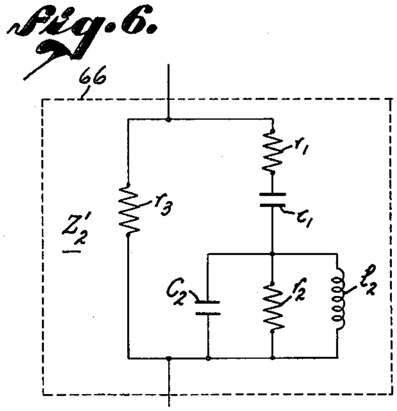
Figure 6 is a schematic wiring diagram of another impedance which bears a reciprocal relationship with the primary impedance of the transformer.

It is possible to obtain many of the advantages of my invention without departing from its fundamental principles by employing a resistance 62 having a value of resistance greater than $R_0-R_c$. In fact, for example, if the value of the resistance 62 equals $R_0$, the impedance network 66 should be replaced by one having an impedance given by the following relationship $$Z_2'(\omega)=\frac{R_0^2}{Z_0(\omega)} \quad (20)$$

instead of relationship indicated by the Equation 1. The corresponding network is illustrated in Figure 6. This network is the same as the one $Z_1'$ formerly described, except that it is shunted by a resistor $r_3$ given by the following equation:

$$r_3=\frac{R_0^2}{R_c} \quad (21)$$

The corresponding transformer coupling network 10, which is illustrated in Figure 6, has slightly different characteristics from the foregoing. These characteristics may be ascertained if desired by substituting $R_0+R_c$ for $R_0$ in Equations 10 to 19 inclusive. An examination of these substituted equations shows that the overall effect of employing a resistor 62 having a value equal to $R_0$ is to increase the low frequency cut-off $f_1$ and to decrease the damping coefficient $Q_0$.

Thus in general it appears that the damping coefficient $Q_0$ which determines the shape of the amplification characteristics at high frequencies, as indicated by the family of curves $K_2$, may be adjusted somewhat by increasing the value of the resistance 62 and making compensation therefore by adjusting the value of the shunting resistance $r_3$ in the impedance network.

Expressed more broadly, if the value of the resistance 62 is R and if the virtual primary impedance with any predetermined load connected across the secondary is $Z_0(\omega)$, the value of the reciprocal impedance 66 should be $$Z_1'(\omega)=\frac{R_0^2}{Z_0(\omega)+R-R_0} \qquad (22)$$

in order to achieve constant input impedance for the network 10.

Figure 7:
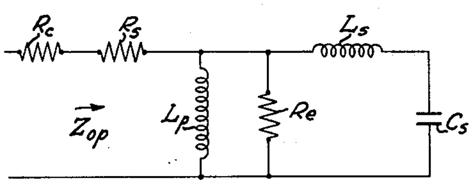
Figure 7 is a schematic wiring diagram of an equivalent circuit approximating the primary impedance of the transformer.
Figure 8:
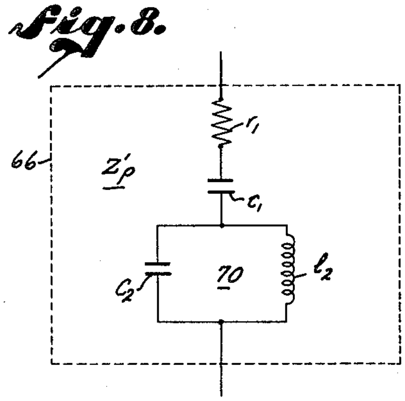
Figure 8 is a schematic wiring diagram of an impedance which bears a reciprocal relationship to the approximate primary impedance of Figure 7.

An approximate equivalent circuit for such a transformer 50 which is found to be satisfactory for many practical purposes is illustrated in Figure 7. For convenience, the impedance of this approximate electrical circuit is designated $Z_{0p}$. Comparing this circuit with that of Figure 3, it is to be noted that the sole difference lies in the fact that the resistance $R_s$ has been moved from the load side to the input side of the inductance $L_p$, thus being in series with the resistor $R_c$. Advantage may be taken of this equivalent circuit by setting the value of the resistance 62 equal to $R_0-R_c-R_s$. In this case because of the transfer of position of the resistance $R_s$, the resistance $r_2$ may be omitted from the impedance network 66, thus forming a network having a suitable reciprocal impedance $Z_p'$ as illustrated in Figure 8. It is to be noted that the reciprocal of the practical equivalent circuit of Fig. 7 is given by the equation, $$Z_p'=\frac{R_0^2}{Z_{0p}-R_c-R_s} \qquad (23)$$

A transformer coupling network 10 employing the approximate impedance network $Z_p'$ is for many practical purposes as useful for impedance matching as the circuit arrangement hereinbefore described employing the complete impedance network $Z_1'$ which is more nearly accurate from a theoretical standpoint. In fact, the transformer coupling network based on the approximate equivalent circuit of Figure 7 has superior low frequency response compared to the one based on the theoretical equivalent circuit of Figure 3 because of the reduction in value of the resistance 62.

It is to be noted that even though the transformer circuit network may be arranged in different ways to obtain highly effective impedance matching, nevertheless in all of the cases described above, an equalizing circuit is employed which utilizes an impedance network which bears a linear reciprocal relationship with the impedance looking into the transformer. In all cases however, the equalizing impedance network which gives best results comprises a capacitance $c_1$ which bears a reciprocal relationship to the primary incremental inductance $L_p$ of the transformer connected in series with a parallel resonance network which includes a capacitance $c_2$ and an inductance $l_2$ which bear reciprocal relationships with the total leakage inductance $L_s$ of the transformer and the loaded secondary capacitance $C_s$ respectively as viewed from the primary circuit. These reciprocal relationships have been expressed hereinbefore in Equations 5, 6, 7, and 9. It is to be noted in this connection that the actual value required for the inductance $l_2$ depends not only upon the fixed value of the secondary distributed capacity $C_s'$, but also upon the capacity $C_g$ of the load which is to be matched, as explicitly set forth in Equation 4. Since, however, in many practical applications the input capacitance $C_g'$ of the load to be supplied is of about the same value which is small compared to the distributed capacity $C_s'$, quite often in practice it is perfectly feasible to design the impedance network 66 in advance with the assurance that it will prove satisfactory in matching the input impedance of many amplifiers 14. For this reason the input capacitance $C_g'$ of the amplifier 14 may be considered as part of the impedance of the transformer 50.

Figure 9:
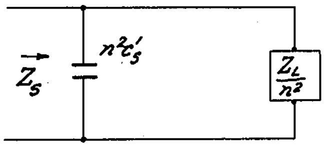
Figures 9 and 10 are schematic wiring diagrams of circuit elements which apply when a transformer supplies a generalized load.
Figure 10:
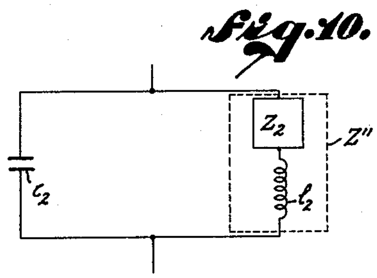

On the other hand, if the transformer coupling network is to supply a different kind of load, this may be taken into account by connecting the reciprocal of this load in series with the inductance $l_2$ of the parallel network 70. In fact, if the coupling network 10 is to feed into a more generalized load $Z_L$, the capacitance $C_s$ of the equivalent circuits should be replaced by an impedance $Z_s$ given by the following equation, $$\frac{1}{Z_s}=n^2\left(j\omega C_s'+\frac{1}{Z_L}\right) \qquad (24)$$

where $C_s'$ is the distributed secondary capacity of the transformer. This impedance is represented in Figure 9. Account may be taken of the more generalized load by connecting the reciprocal $Z_L$ of the generalized load in series with the parallel inductance $l_2$ of the impedance network as illustrated in Figure 10. The parallel network 70 thus has one branch comprising an impedance $Z''$ in which the reciprocal $Z_2$ of the generalized load is connected in series with the reciprocal $l_2$ of the secondary distributed capacity. The value of $Z_2$ is given by the equation $$Z_2=\frac{(nR_0)^2}{Z_L} \qquad (25)$$

and the value of $l_2$ by the equation $$l_2=(nR_0)^2C_s' \qquad (26)$$

In any event, by following the principles of design outlined, a transformer coupling network having a substantially constant input resistance $R_0$ may be constructed and thus improved impedance matching obtained.

*Form 1.—Example*

In a particular application in which a transformer coupling network 10 was designed to match a 600-ohm line 12 with an amplifier 14 having an input capacitance of $C_g'$ equal to 12 $\mu\mu$F, a shell-type transformer 50 was employed having the following characteristics:

| | |
|---|---|
| Number of turns on primary winding | 469 |
| Number of turns on secondary winding | 6120 |
| $n$ | 13.15 |
| $L_p$ | 14.4 h. |
| $R_c+R_s$ | 211 Ω |
| $R_e$ | 24,000 Ω |
| $L_s$ | 1.900 mh. |
| $C_s$ | 0.01029 $\mu$f. |
| $f_0$ | 31,300 C. P. S. |
| $Q_0$ | 0.737 |

The corresponding set of circuit constants of the impedance network 66 employed therewith in order to match a 600-ohm line were as follows:

| | |
|---|---|
| $r_1$ | 15 Ω |
| $c_1$ | 40 μf. |
| $c_2$ | 0.00528 μf. |
| $r_2$ | ∞ |
| $l_2$ | 3.70 mh. |

Figure 11:
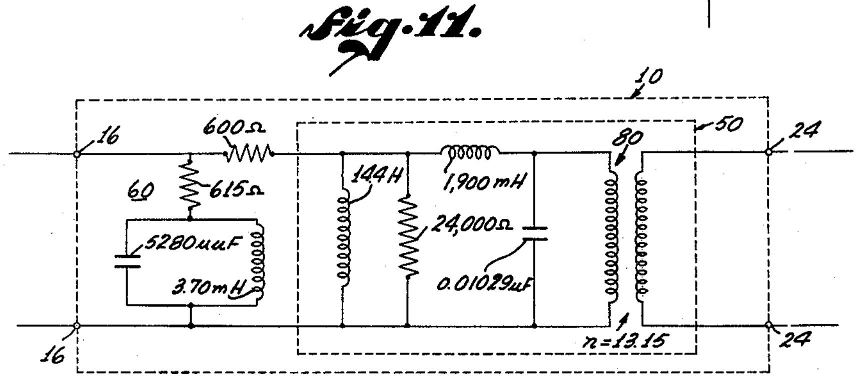
Figure 11 is a schematic wiring diagram showing values of circuit elements employed in a particular coupling network.

It is to be noted that the approximate equivalent circuit of Figure 7 and the corresponding reciprocal impedance of Figure 8 were employed in this example. The corresponding equivalent of the coupling network 10 is illustrated in Figure 11. In this equivalent network the input capacitance of the amplifier 14 is treated as part of the network and an "ideal" transformer 80 having perfect coupling and a turns ratio $n$ and an input impedance large compared to $C_s$, is represented in the output.

Tests of the transformer coupling network employing the particular transformer mentioned and the corresponding impedance network showed that, in fact, the apparent input resistance measured across the input terminals 16 of the coupling circuit 10 was nearly constant over the band of frequencies to be amplified. The actual measured values of resistance at different frequency are indicated in column A of Table I.

TABLE I

| $f$ | A (With $c_1$) | B ($c_1$ omitted) | C (Conventional) |
|---|---|---|---|
| 20 C. P. S. | 600 | 545 | 589 |
| 100 C. P. S. | 588 | 585 | 607 |
| 1,000 C. P. S. | 599 | 598 | 617 |
| 10,000 C. P. S. | 607 | 607 | 603 |
| 20,000 C. P. S. | 599 | 603 | 533 |

In column B of this table, corresponding values are given for the input resistance when the series capacitance $c_1$ of the equalizing circuit was omitted as shown in Fig. 4. And in column C similar data is given for a power-type transformer connected in conventional manner without employing any equalizing circuit. The superiority of the results to be obtained by employing an equalizing circuit are obvious from the table. In particular, it is to be noted that improved results are obtained at high frequencies, both with and without a series condenser $c_1$ (see Fig. 4), and that good results are obtained at low frequencies too when the series condenser $c_1$ is employed.

*Form 2*

Figure 12:
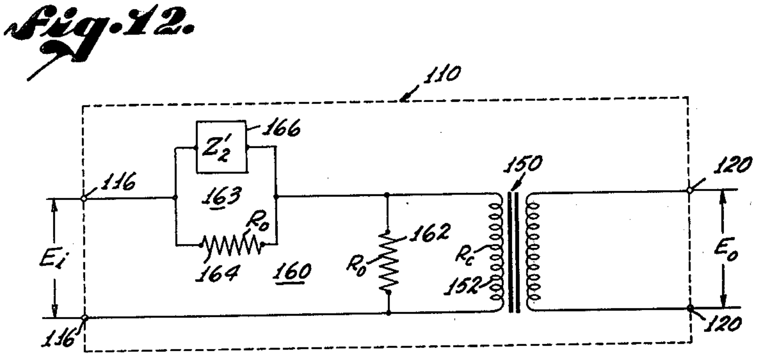
Figure 12 is a schematic wiring diagram of a second form of my transformer coupling network.

In Figure 12 there is illustrated a second form of impedance matching network 110 which employs a transformer 150 which has the same characteristics as that described hereinabove but which has a different equalizing circuit 160. This equalizing circuit comprises a resistor 162 which shunts the primary winding 152 of the transformer 150, and also comprises a parallel network 163 which includes a resistance 164 and a reciprocal impedance network 166. The values of the two resistances 162 and 164 are each equal to $R_0$, that is, the value of the constant resistance impedance desired across the input terminals 116. In this particular case, since the internal resistance $R_c$ of the primary winding 152 is not lumped with some other resistance, an impedance network 166 having an impedance $Z_2'$ of the type illustrated in Figure 6 is employed. The coupling network 110 possesses the same overall characteristics as the one formerly described, the ratio of the output voltage $E_0$ appearing across the output terminals 120 bearing the same relationship to the voltage $E_i$ impressed upon the input terminals 116 as expressed by Equations 10 to 19 inclusive, taking due account of the inclusion of the resistance $R_c$ in series with the primary winding and the shunting resistance $r_3$ of the impedance network 166.

Because of the manner in which the primary winding resistance $R_c$ appears in this circuit 110, the overall characteristics are the same as those of the variation of the first form 10 employing the impedance network $Z_2'$ and is therefore not quite as satisfactory as the variation of the first form 10 employing the impedance network $Z_1'$ because of the resultant loss of low frequency response.

*Form 3*

Figure 13:
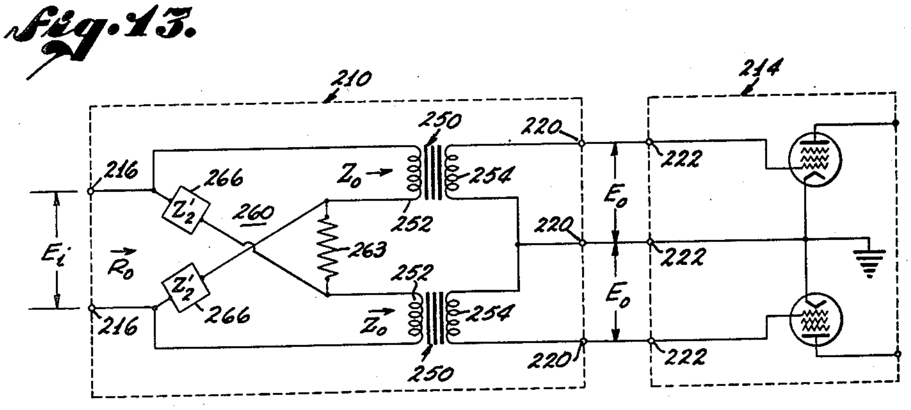
Figure 13 is a schematic wiring diagram of a third form of my transformer coupling network.

A third form of transformer coupling network 210 illustrated in Figure 13 is particularly suitable for supplying signals to an amplifier 214 having a balanced input represented by three input terminals 222. This transformer coupling network 210 employs three corresponding output terminals 220 which are respectively connected to the three input terminals 210 of the amplifier 214 but employs only two input terminals 216 adapted for connection to a corresponding input circuit. The coupling network 210 employs two transformers 250 each having a corresponding primary winding 252 and a secondary winding 254. The respective secondary windings 254 are connected between adjacent output terminals 220 of the coupling network 210. Each of the transformers has the same impedance $Z_0$ as viewed from the primary, and for this purpose two transformers 250 may be employed identical in characteristics with the first transformer 50 described above.

In this network 210 an equalizing circuit 260 is employed which includes a single resistance 263 and two like impedance networks 266. These elements and the primary windings 252 of the transformers 250 are arranged in a lattice or bridge network. When considered as a lattice network, the two primary windings 252 are connected in opposite sides thereof in series with the load resistance 263 and the two impedance networks 266 are diagonally connected to the load resistance 263 from opposite sides of the input. When considered as a bridge it is to be noted that the two primary windings 252 are arranged in one pair of conjugate arms and the two impedance networks 266 are arranged in the remaining pair of conjugate arms and the resistance 263 is connected in the diagonal or output position.

When the resistance 263 has a value equal to $R_0$ and each of the impedance networks 266 is the reciprocal of the transformer input impedance $Z_0$, the output voltage $E_0$ appearing across the secondary winding 254 of each transformer is equal to the output voltage appearing across the secondary winding of the transformer of either of the first and second transformer networks 10 and 110. Thus it appears that even when the input resistance of the third form of network 210 is the same as that of the first and second forms transformer networks described, the total voltage appearing across the extreme output terminals 210 is twice that obtained with the first two forms.

*Form 4*

Figure 14:
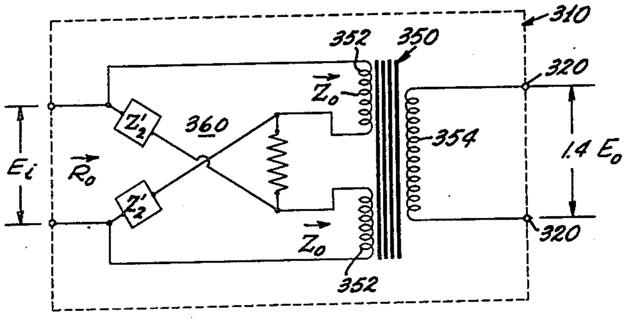
Figure 14 is a schematic wiring diagram of an electrical amplifier circuit employing a fourth form of my transformer coupling network.

The fourth form of transformer coupling network 310 illustrated in Figure 14 is somewhat similar to the third form illustrated in Figure 11, but employs only a single transformer 350 and only two output terminals 320. The transformer 350 employs a single secondary winding 354 connected between the output terminals 320, but also employs two primary windings 352 which are connected in opposite sides of the lattice network 360. These connections of the primary windings 352 in the lattice network are the same as those described in connection with the third form of coupling network 210, the only difference being in the fact that the two primary windings 352 are now mounted upon a common core 356. The two primary windings 352 are mutually coupled in one-to-one relationship and carry equal currents due to their symmetrical positions in the network. The two primary windings 352 are connected so that the voltages induced in the secondary winding 354 are in phase.

Because of this coupling of the two primary windings 352, the number of turns in each primary winding is made 0.70 of the number employed in the primary windings of the transformers previously described herein, in order to produce the same impedance $Z_0$ looking into each of the primary windings. This relationship applies as long as the primary windings 352 are operated simultaneously in a symmetrical network. Due to the reduction in the number of turns in each of the primary windings, the turns ratio of the secondary winding with respect to each of the primary windings is no longer $n$ as formerly, but is now $1.4n$. This means that for a given secondary winding the voltage appearing across the output terminals 320 is now 1.4 $E_0$ instead of $E_0$. In other words, by splitting the primary winding of a transformer and connecting it in a lattice network as described, and increasing the total number of turns on the primary by a factor 1.4, a larger output signal is obtained than in Forms 1 and 2, but a smaller output than in Form 3.

CONCLUSION

From the foregoing description of the several forms of my invention it is clear that I have provided an improved transformer coupling network which possesses a substantially constant resistance over a wide frequency range, and which is particularly suitable for matching the constant resistance output impedance of some signal source with the input impedance of an amplifier. According to my invention such impedance matching is obtained without introducing undesirable and unexpected discrimination because of differences of transformer input impedances at different frequencies. Furthermore, from the foregoing description it will be appreciated that my improved transformer coupling network is capable of producing higher signal gain over a predetermined frequency band than is obtainable with a conventional impedance matching circuit, and that as a result my circuit may be employed for improving the signal-to-noise ratio at the input of an amplifier which is supplied by a transformer.

Though my invention has been described with particular reference to audio amplification systems employing iron-core transformers, it is equally applicable to other systems, such as video amplification systems, employing air-core transformers.

While my invention has been described more or less in detail with reference to certain embodiments thereof, it will be understood that many changes may be made therein without departing from the principles of my invention. It is therefore to be understood that many modifications and changes may be made in the details of the circuits described, as will now appear to those skilled in the art, without departing from the nature of my invention but still within the scope of the appended claims.

I claim:

1. In an alternating current circuit having an input and an output and adapted to transmit alternating currents over a predetermined range of frequencies from said input to said output, a transformer having a primary winding and a secondary winding, said secondary winding being connected to said output, said secondary winding resonating at a frequency in said frequency range, said transformer having an impedance $Z_0(\omega)$ when viewed from said input, a compensating resistance means having a resistance value of $R_0$, and a reciprocal network having an impedance $Z'(\omega)$ related to said impedance $Z_0(\omega)$ by the equation $$Z'(\omega)=\frac{R_0^2}{Z_0(\omega)}$$

said compensating resistance means and said reciprocal network being so connected between said input and said primary winding as to render the impedance measured across said input a substantially constant resistance over said frequency range.

2. An alternating current circuit as defined in claim 1 wherein said impedance $Z_0$ comprises the reactance of an inductance $L_s$ and the reactance of capacitance $C_s$ connected in series and said reciprocal network comprises a compensating inductance $l_2$ and a compensating capacitance $c_2$ connected in parallel, the value of said compensating inductance being given by the equation.

$$l_2=R_0^2C_s$$

and the value of said capacitance being given by the equation $$c_2=\frac{L_s}{R_0^2}$$

3. In an alternating current circuit having an input and an output, a transformer having a primary winding and a secondary winding, said secondary winding being connected to said output, a resistor $R_0$ connected in series with said primary winding across said input, said transformer having an impedance $Z_0(\omega)$ when viewed from said input, and a compensating resistance $R_0$ and a compensating network connected in series across said input, said compensating network having an impedance $Z'(\omega)$ related to said impedance $Z_0(\omega)$ by the equation $$Z'(\omega)=\frac{R_0^2}{Z_0(\omega)}$$

whereby the impedance measured across said input is a substantially constant resistance over a range of frequencies of alternating currents applied thereto.

4. An alternating current circuit as defined in claim 3 wherein said impedance $Z_0(\omega)$ comprises the reactance of an inductance $L_s$ and the reactance of capacitance $C_s$ connected in series and said compensating network comprises an inductance $l_2$ and a capacitance $c_2$ connected in parallel, the value of said inductance being given by the equation $$l_2=R_0^2C_s$$

and the value of said capacitance being given by the equation $$c_2=\frac{L_s}{R_0^2}$$

5. An alternating current circuit as defined in claim 4 wherein said impedance comprises a resistance $R_e$ that is connected across said inductance $L_s$ and said capacitance $C_s$ and wherein said compensating network comprises a resistor $r_1$ given by the equation $$r_1=\frac{R_0^2}{R_e}$$

connected between said compensating resistance $R_0$ and said inductance and capacitance.

6. An alternating current circuit as defined in claim 5 wherein said impedance comprises an inductance $L_p$ that is also connected across said inductance $L_s$ and said capacitance $C_s$.

7. An alternating current circuit as defined in claim 6 wherein said compensating network also comprises a condenser $c_1$ given by the equation $$c_1=\frac{L_p}{R_0^2}$$

connected in series with said resistor $r_1$ between said compensating resistor $R_0$ and said compensation inductance $l_2$ and capacitance $c_2$.

8. In a transformer network having an input and an output a transformer having a primary winding and a secondary winding, said secondary winding being connected across said output, the equivalent circuit of the virtual primary impedance comprising an incremental primary inductance and a series circuit connected across said incremental inductance, said series circuit being represented by a total leakage inductance $L_s$ connected in series with a capacitance $n^2C_s'$, where $C_s'$ is the secondary distributed capacitance of said transformer and $$n=\frac{\text{number of turns on secondary winding}}{\text{number of turns on primary winding}}$$

and a parallel network having a compensating capacitance and a compensating inductance connected in parallel therein, said compensating capacitance $c_2$ having a value that is the reciprocal of said leakage inductance, which value is given by the equation $$c_2=\frac{L_s}{R_0^2}$$

and said compensating inductance $l_2$ having a value which is approximately the reciprocal of the secondary distributed capacitance as viewed from the primary winding and which is given approximately by the equation $$l_2=(nR_0)^2C_s'$$

and resistance means having a value $R_0$, said resistance means, said compensating capacitance and said compensating inductance being so connected and their values being such that said transformer network possesses a substantially constant resistance $R_0$ over said frequency range.

9. In a transformer network having an input and an output, a transformer having a primary winding and a secondary winding, said secondary winding being connected across said output, the equivalent circuit of the virtual primary impedance comprising an incremental primary inductance and a series circuit connected across said incremental inductance, said series circuit being represented by a total leakage inductance $L_s$ connected in series with a capacitance $n^2C_s'$, where $C_s'$ is the secondary distributed capacitance of said transformer and $$n=\frac{\text{number of turns on secondary winding}}{\text{number of turns on primary winding}}$$

a compensating capacitance $c_2$ having a value that is the reciprocal of said leakage inductance, which value is given by the equation $$c_2=\frac{L_s}{R_0^2}$$

and a compensating inductance $l_2$ having a value which is approximately the reciprocal of the secondary distributed capacitance as viewed from the primary winding and which is given approximately by the equation $$l_2=(n^2R_0^2)C_s'$$

means connecting said compensating capacitance and said compensating inductance in parallel in a parallel network, said parallel network and said primary winding being connected in parallel, and resistance means having a value $R_0$, said resistance means, said compensating capacitance and said compensating inductance being so connected and their values being such that said transformer network possesses a substantially constant resistance $R_0$ over said frequency range.

10. In a transformer network having an input and an output, the combination which comprises: a transformer having a primary winding and a secondary winding, said secondary winding being connected across said output, said transformer as viewed from the primary winding being representable by an equivalent circuit which includes a leakage inductance $L_s$ connected in series with a loading capacitance $C_s$ whereby the virtual impedance measured across the primary winding is a variable function over a predetermined frequency range including the frequency at which said leakage inductance and said loading capacitance resonate, and an equalizing circuit comprising a network including a compensating capacitance $c_2$ and a compensating inductance $l_2$ connected in parallel therein, said compensating capacitance and said compensating inductance being characterized by having values that are related to said constant resistance, said leakage inductance, and said loading capacitance by the following equations:

$$c_2=\frac{L_s}{R_0^2}$$

and $$l_2=R_0^2C_s$$

said parallel network and said primary winding being connected in parallel, and resistance means having a value $R_0$, said resistance means, said compensating capacitance and said compensating inductance being so connected and their values being such that said transformer network possesses a substantially constant resistance $R_0$ over said frequency range.

11. In a transformer network having an input and an output for transmitting from said input to said output audio frequency waves in a predetermined frequency range, and including a transformer having a primary winding and a secondary winding wound on an iron core, said secondary winding being connected across said output, the equivalent circuit of the virtual primary impedance comprising an incremental primary inductance and a series circuit connected across said incremental inductance, said series circuit being represented by a total leakage inductance $L_s$ connected in series with a loading capacitance $C_s$, and equalizing means including resistance means and a parallel network connected between said primary winding and said input, said parallel network having a compensating capacitance $c_2$ and a compensating inductance $l_2$ connected in parallel branches thereof, said capacitance $c_2$ having a value that is the reciprocal of said leakage inductance and which is given by the equation $$c_2=\frac{L_s}{R_0^2}$$

and said inductance $l_2$ having a value that is the reciprocal of said loading capacitance and which is given by the equation $$l_2=R_0^2C_s$$

where the resonant frequency of said series circuit and the anti-resonant frequency of said parallel network are equal and lie in said frequency range, said resistance means being so connected and proportioned that the impedance measured across said input is a substantially constant resistance $R_0$, whereby amplitude distortion caused by said leakage inductance and said capacitance is compensated in said frequency range.

12. In a transformer network having an input and an output for transmitting from said input to said output audio frequency waves in a predetermined frequency range, and including a transformer having a primary winding and a secondary winding wound on an iron core, said secondary winding being connected across said output, the equivalent circuit of the virtual primary impedance comprising an incremental primary inductance and a series circuit connected across said incremental inductance, said series circuit being represented by a total leakage inductance $L_s$ connected in series with a loading capacitance $C_s$, means connecting said primary winding across said input, and an equalizing means including resistance means and a parallel network connected across said input and across said primary winding, said parallel network having a compensating capacitance $c_2$ and a compensating inductance $l_2$ connected in parallel branches thereof, said compensating capacitance $c_2$ having a value that is the reciprocal of said leakage inductance and which is given by the equation $$c_2=\frac{L_s}{R_0^2}$$

and said compensating inductance $l_2$ having a value that is the reciprocal of said loading capacitance and which is given by the equation $$l_2=R_0^2C_s$$

where the resonant frequency of said series circuit and the anti-resonant frequency of said parallel network are equal and lie in said frequency range, said resistance means being so connected and proportioned that the impedance measured across said input is a substantially constant resistance $R_0$, whereby amplitude distortion caused by said leakage inductance and said capacitance is compensated in said frequency range.

13. In a transformer network having an input and an output for transmitting from said input to said output audio frequency waves in a predetermined frequency range, and including a transformer having a primary winding and a secondary winding wound on an iron core, said secondary winding being connected across said output, the equivalent circuit of the virtual primary impedance comprising an incremental primary inductance and a series circuit connected across said incremental inductance, said series circuit being represented by a total leakage inductance $L_s$ connected in series with a loading capacitance $C_s$, and equalizing means connected between said primary winding and said input, said equalizing means comprising a first resistor having a value $R_0$ connected across said primary winding, said first resistor and said primary winding forming a first parallel circuit, said equalizing circuit also comprising a second parallel circuit connected in series with said first parallel circuit across said input, said second parallel circuit comprising two parallel branches, one of said branches comprising a resistor having a value $R_0$ and the other of said branches comprising a parallel network having a compensating capacitance $c_2$ and a compensating inductance $l_2$ connected in parallel branches thereof, said compensating capacitance $c_2$ having a value that is the reciprocal of said leakage inductance and which is given by the equation $$c_2=\frac{L_s}{R_0^2}$$

and said compensating inductance $l_2$ having a value that is the reciprocal of said loading capacitance and which is given by the equation $$l_2=R_0^2C_s$$

where the resonant frequency of said series circuit and the anti-resonant frequency of said parallel network are equal and lie in said frequency range, whereby amplitude distortion caused by said leakage inductance and said capacitance is compensated in said frequency range.

14. In a transformer network having an input and an output for transmitting from said input to said output audio frequency waves in a predetermined frequency range, and including a secondary winding means connected across said output, a pair of primary windings inductively coupled by iron core means to said secondary winding means, the equivalent circuit of the virtual primary impedance of each primary winding being the same and comprising an incremental primary inductance and a series circuit connected across said incremental inductance, said series circuit being represented by a total leakage inductance $L_s$ connected in series with a loading capacitance $C_s$, the improvement which comprises: an equalizing circuit operatively connecting said primary windings to said input for rendering the impedance measured across said input a substantially constant resistance $R_0$ over said frequency range, said equalizing circuit comprising a resistor having a value equal to said constant resistance $R_0$ connected between two ends of the respective primary windings, the remaining ends of said primary windings being connected to opposite sides of said input and also a pair of parallel networks diagonally connecting the respective sides of said input to the respective two ends of said primary windings, each of said networks comprising a compensating capacitance $c_2$ and a compensating inductance $l_2$ operatively connected in parallel branches thereof, the compensating capacitance $c_2$ of each parallel network having a value that is the reciprocal of said leakage inductance and which is given by the equation $$c_2=\frac{L_s}{R_0^2}$$

and the compensating inductance $l_2$ of each parallel network having a value that is the reciprocal of said loading capacitance and which is given by the equation $$l_2=R_0^2C_s$$

where the resonant frequency of each said series circuit and the anti-resonant frequency of each said parallel network are equal and lie in said frequency range, whereby amplitude distortion caused by said leakage inductance and the said capacitance is compensated in said frequency range.

15. A transformer network as defined in claim 14 wherein said magnetic core means comprises a single magnetic core inductively linking said secondary winding means and both of said primary windings.

16. In a transformer network having an input and an output, the combination which comprises: a transformer having a primary winding and a secondary winding, said secondary winding being connected across said output, said transformer as viewed from the primary winding being representable by an equivalent circuit which includes a leakage inductance $L_s$ connected in series with a loading capacitance $C_s$ whereby the virtual impedance measured across the primary winding is a variable function over a predetermined frequency range including the frequency at which said leakage inductance and said loading capacitance resonate, and an equalizing circuit interconnecting said primary winding and said input, said equalizing circuit comprising resistance means and a parallel network including a compensating capacitance $c_2$ and a compensating inductance $l_2$ connected in parallel therein, said compensating capacitance and said compensating inductance being characterized by values that are related to said constant resistance, said leakage inductance, and said loading capacitance by the following equations:

$$c_2=\frac{L_s}{R_0^2}$$

and $$l_2=R_0^2C_s$$

said resistance means, said compensating capacitance and said compensating inductance being so connected and their values being such that said transformer network possesses a substantially constant resistance $R_0$ over said frequency range.

17. In a transformer network having an input and an output and including a transformer having a primary winding and a secondary winding, said secondary winding being connected across said output, the virtual impedance measured across the primary winding being a variable function $Z_0(\omega)$ of frequency throughout a frequency range overlapping a resonant frequency, the damping coefficient of the secondary winding at said resonant frequency being about unity, an equalizing network comprising the combination of: a first resistor connected in series with said primary winding across said input, the value of said first resistor being $R=R_0-R_c$ where $R_c$ is the effective series resistance of said transformer viewed from the primary side thereof, a second resistor and a compensating network having a reciprocal impedance $Z'(\omega)$, said second resistor and said compensating network being connected in series with each other across said input, said second resistor having a value $R_0$, said reciprocal impedance $Z'(\omega)$ bearing a linear reciprocal relationship to a circuit comprising said first resistor and said virtual impedance $Z_0(\omega)-R_c$, whereby the impedance looking into the input of said transformer network is a substantially constant resistance having a value $R_0$.

18. In a transformer network having an input and an output and including a transformer having a primary winding and a secondary winding, said secondary winding being connected across said output, the virtual impedance $Z_0(\omega)$ measured across the primary winding being a variable function $Z_0(\omega)$ of frequency, the damping coefficient of the secondary winding at resonance being about unity an equalizing network comprising the combination of: a first resistor having a value of R connected in series with said primary winding across said input, a second resistor and a compensating network having a reciprocal impedance $Z'(\omega)$ connected in series with each other across said input, said second resistor having a value $R_0$ and said impedance $Z'(\omega)$ being related to said virtual impedance by the equation $$Z'(\omega)=\frac{R_0^2}{Z_0(\omega)+R-R_0}$$

whereby the impedance looking into the input of said transformer network is a substantially constant resistance having a value $R_0$.

RAYMOND C. OLESEN.

References Cited in the file of this patent

UNITED STATES PATENTS

| Number | Name | Date |
|---|---|---|
| 1,333,111 | Hoyt | Mar. 9, 1920 |
| 1,430,808 | Hoyt | Oct. 3, 1922 |
| 1,511,013 | Affel | Oct. 7, 1924 |
| 1,530,648 | Casper | Mar. 24, 1925 |
| 1,530,649 | Casper | Mar. 24, 1925 |
| 1,606,817 | Stevenson | Nov. 16, 1926 |
| 1,762,737 | Peterson | June 10, 1930 |
| 2,125,119 | Hyman | July 26, 1938 |
| 2,301,245 | Bode | Nov. 10, 1942 |
| 2,333,148 | Botsford | Nov. 2, 1943 |